Dec. 12, 1939.   W. VOIT ET AL   2,183,034
AIR SEPARATOR FOR FUEL PUMPING APPARATUS OF INTERNAL COMBUSTION ENGINES
Filed June 18, 1937   2 Sheets-Sheet 2
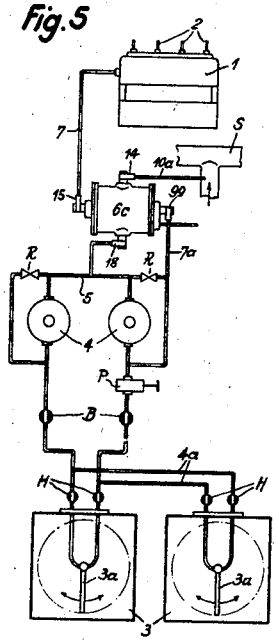
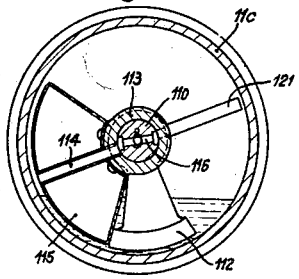
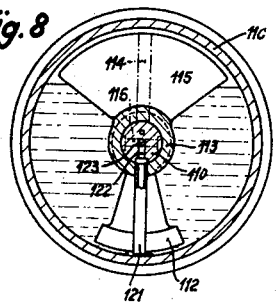
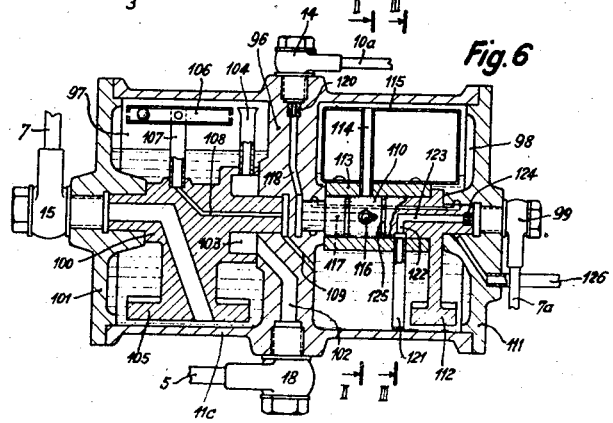

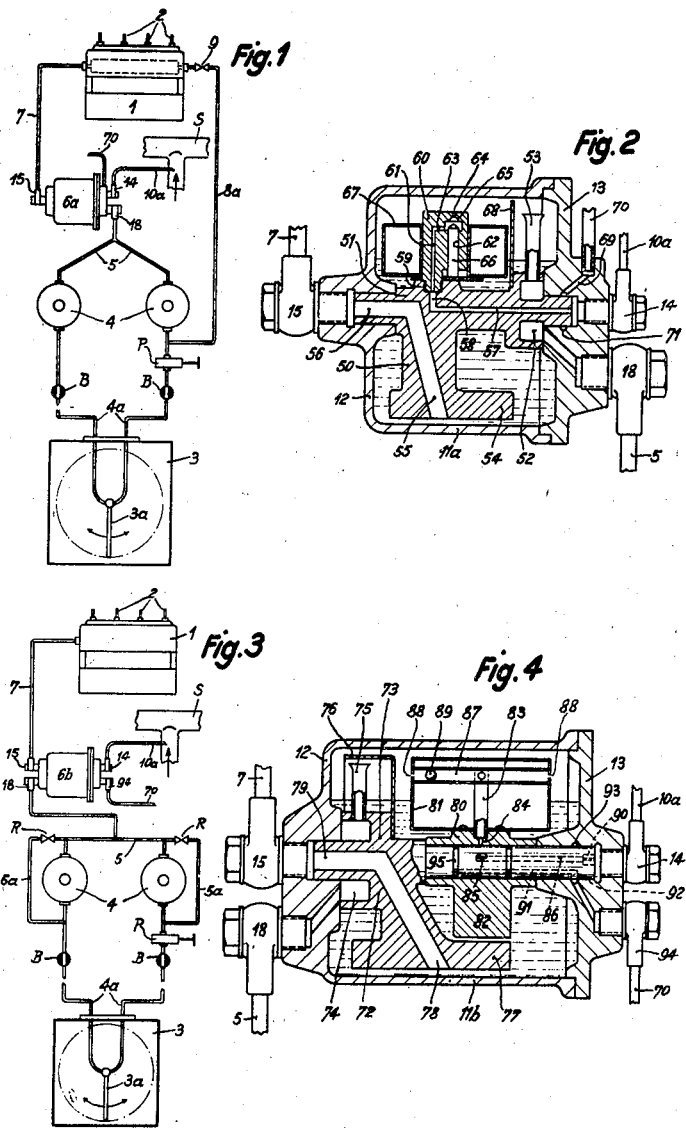

Patented Dec. 12, 1939

2,183,034

UNITED STATES PATENT OFFICE 2,183,034

AIR SEPARATOR FOR FUEL PUMPING APPARATUS OF INTERNAL COMBUSTION ENGINES

Willy Voit, Stuttgart-Bad Cannstatt, and Johann Friedrich Janssen, Stuttgart, Germany, assignors to Robert Bosch Gesellschaft mit beschränkter Haftung, Stuttgart, Germany Application June 18, 1937, Serial No. 149,038
In Germany June 22, 1936

5 Claims. (Cl. 183—2.5)

In injection apparatus for internal combustion engines such as aircraft engines, a hand-pumping apparatus, two delivery pumps and the injection pump are arranged near the internal combustion engine, while the reservoirs for the fuel are frequently arranged remotely from the engine. So long as everything is in order, the delivery pumps deliver considerably more fuel free from bubbles than the injection pumps consume when adjusted for full load. The excess fuel is, as a rule, conveyed back to the suction side of the delivery pump through a return flow valve adjusted to a predetermined pressure. By the use of an air separator arranged between the delivery pump and the injection pump, surplus fuel can also flow away through the air discharge pipe. In order to prevent separated air passing to the suction side of the delivery pumps, the air discharge pipe, through which, as stated, also fuel can flow away, must here, departing from the rule, be conveyed back into the reservoir, for which purpose a long return pipe is necessary in many plants. Where several fuel reservoirs are provided, the conveying back of the separated air which still contains fuel to the reservoir that is for the time being connected to the delivery apparatus is very awkward.

According to the present invention the return pipe to the reservoir for the air separated in the air separator can be entirely dispensed with, if a float is arranged in the air separator, which float is arranged in an air-separating chamber, and by the float action that it experiences on immersion in the fuel reaching the chamber, causes the closing of the air discharge pipe leading from the chamber as soon as, and so long as, the level of fuel in the chamber exceeds a predetermined position, being always situated lower than the mouth of the said pipe in the chamber, which mouth adjusts itself automatically in consequence of float or gravity action independently of the position of the casing of the chamber so that only air can flow away through the open pipe.

Several examples of construction of the invention are shown in the accompanying drawings, in which:

Figure 1 is a general arrangement of a fuel-pumping plant provided with an air separator and having excess delivery through the suction chamber of the injection pump.

Figure 2 is a longitudinal section through the first example of construction.

Figure 3 is a diagram of a fuel-pumping plant in which there is no flushing of the suction chamber of the injection pump by the excess of fuel pumped.

Figure 4 is a longitudinal section through a second construction.

Figure 5 is a plan of a fuel-pumping plant having two fuel reservoirs.

Figure 6 is a longitudinal section through a third example of construction.

Figure 7 is a section on the line II—II of Figure 6, in which it is assumed that only very little fuel is contained in the float chamber of the separator.

Figure 8 is a section on the line III—III of Fig. 6; it is here assumed that the float chamber of the separator is entirely, or almost entirely, filled with fuel.

In the drawings 1 denotes an injection pump, which delivers fuel through pressure pipes 2 to the injection nozzles of an internal combustion engine (not shown). Two delivery pumps 4 are remotely connected to a fuel container 3, and draw fuel by means of the pivoted pipe 3a from the container and convey it through the delivery pipe 5 to an air separator 6a. In the suction pipe 4a of each delivery pump 4 closure cocks B are arranged, whilst a manually operated pumping device P is provided in the suction pipe of one delivery pump. The air separator 6a is connected to one end of the suction chamber of the injection pump 1 by a pipe 7, through which fuel freed from air is delivered in excess to this pump. The other end of the suction chamber of the pump 1 is connected to the suction pipes 4a of the delivery pumps 4 by a pipe 8a, through which the excess fuel not taken up by the separate pumps of the injection apparatus is conveyed back to the suction side of the delivery pumps 4. An overflow valve 9 in the pipe 8a is adjusted to the desired pressure in the suction chamber of the injection pump. An air discharge pipe 10a from the separator opens into the induction pipe S of the internal combustion engine.

The cylindrical casing 11a of the air separator comprises a bottom 12, which in the construction illustrated constitutes one end of the casing, and a screwed-on cover 13 which constitutes the other end. In the centre of the boss of the cover a threaded bore is provided for the pipe union 14 of the air discharge pipe 10a, and below it for the union 18 of the fuel feed pipe 5 leading from the delivery pumps 4 to the separator. In the centre of a boss on the base of the casing the pipe 7 for the purified fuel is connected to the internal space of the separator by means of the union 15. A pendulum 50 adapted to swing about the axis of the casing is mounted in the bosses in the cover and bottom, and in it an annular space 52 closed by the boss of the cover is arranged. This annular space is in communication with the union 18 and the fuel feed pipe 5 and from it a pipe 53 fixed to the rotatable member conveys fuel into the internal space of the casing.

The hub 51 of the pendulum carries a suspended weight 54 on its lower end, whereby the centre of gravity of the pendulum lies below its axis of rotation. A bore or passage 55 starting from the lowest part of the pendulum connects with a longitudinal bore 56, which is always connected by the union 15 to the pipe 7 for purified fuel leading to the suction chamber of the fuel pump.

In the cover end of the journal bearing of the rotatable member a longitudinal bore 57 is formed, which through the union 14 communicates at one end with the air discharge pipe 10a and at the other end opens into the interior of the separator through a bore 58 and a radial recess 59 having a thread. A valve piece 60 in which two longitudinal bores 61 and 62 are provided is screwed into the thread of the recess 59. One end of bore 61 is in communication with the bore 58. The other end of bore 61 does not extend to the free end of the valve piece, but is in communication with the second bore 62 by a transverse passage 63. The longitudinal bore 62 merges from its contracted mouth 64 at the free end of the valve piece into a conical valve seat 65 and opens at the other end into a face of the valve piece situated at some distance from the socket of the rotatable member. In the bore 62 is a valve-needle 66, which is fixed at its lower end to a float 67 surrounding the valve piece. The float is guided on the valve piece, and together with the valve needle can move radially of the rotatable member. Between the pipe 53 and the float 67 a partition wall 68 is secured to the hub 51 of the rotatable member, and this prevents fuel, entering the separator through the pipe 53, from directly passing to the valve opening 64 at the free end of the valve piece.

In the boss of the cover of the casing a pipe 70 for feeding sealing oil is connected to a bore 69, whilst an oil groove 71 is provided in the part of the boss surrounding the journal bearing of the rotatable member at this end which groove is in communication with the bore 69. The sealing oil fed under pressure through the pipe 70 prevents fuel passing from the annular space 52 along the journal bearing of the rotatable member to the air discharge pipe 10a.

An air separator of this construction is so arranged according to Figure 1, in the pumping plant of an internal combustion engine that is variable in position, for example an aircraft engine, that in the normal position the axis of displacement of the swinging member of the air separator lies normal to the direction of flight. In upward and downward movements of the engine, in which the casing of the air separator rocks about its axis which remains horizontal, the pendulum tends to hold the mouth of the discharge bore 55 of the rotatable member always in the lower internal space of the separator that is filled with fuel freed from air, so that this fuel can pass unhindered to the injection pump. If the fuel in the air separator exceeds a predetermined height, the float 67, and with it the valve needle is raised to such an extent, that the valve needle engages with the conical seat in the valve member, so that the connection between the internal space of the casing of the air separator and the air discharge pipe 10a is interrupted.

If fuel containing air or gas bubbles is fed into the separator, the bubbles collecting for the time being in the upper part of the internal space have a downward pressure action on the level of the fuel. After said level has fallen below a predetermined height the float also sinks whereupon the valve needle opens the conical valve, so that the air can escape to the induction pipe 10 through the discharge pipe containing a throttle. The upward movement of the float must overcome the opposing pressure acting on the valve in the opening direction and also the friction of the needle in the valve member. The throttling of the air being drawn off is necessary, so that the pressure in the air separator may not fall below the pressure desired in the suction chamber of the injection pump.

If, as in the diagram of a fuel-pumping plant shown in Fig. 3, the feature is abandoned of running the fuel delivered in excess through the suction chamber of the injection pump, the excess of fuel pumped by the delivery pumps 4 can be led directly from the pressure side to the suction side of these pumps. The pressure pipe 5 of each of the delivery pumps 4 is connected, in this case, to the suction pipe 4a connected to the fuel reservoir 3 by a pipe 5a through an overflow valve R adjusted to the delivery pressure of these pumps. Here, only as much fuel flows to the air separator 6b as the injection pump can deal with.

In Figure 4 an example of construction of an air separator for a pumping plant such as shown in Figure 3 is illustrated. A rotatable member 72 is mounted in the centre of the bottom 12 and the cover 13 of a cylindrical casing 11b. On the side of the rotatable member facing the casing bottom, an annular space 74, open towards the bottom of the casing, is arranged in its hub 73, and is closed by this bottom. The annular space is connected, on the one hand, to the feed pipe 5 connected to the casing bottom, and on the other hand, two pipes 75 fixed in the hub of the rotary member lead to the internal space of the casing. The stream of fuel emerging from the free end of these pipes strikes on a baffle-plate 76 secured to the rotatable member, which shuts off the chamber for the feed of the fuel from the rest of the internal space of the casing, and is only open towards the bottom of the casing. The rotatable member carries a pendulum-like weight 77 on the half opposite the pipes 75, by which the centre of gravity of the rotary member is shifted in this direction from the axis of the rotatable member. A bore 78, starting from the lowest part of the pendulum, connects through a longitudinal bore 79 the part of the interior of the casing that is for the time being at the bottom with the discharge pipe 7 for the fuel free from bubbles connected to the bottom of the casing. The air discharge pipe 10a is connected to the centre of the cover 13 of the casing.

On the offset axis 73 of the rotatable member 72 a bush 80 is rotatably mounted, which at one side carries a float 81 and opposite thereto a pendulum-like weight 82, by which the weight of the float is balanced. A pipe 83 is carried radially to the bush through the body of the float and fastened to the bush. A radial bore 84 connects the end of the pipe with the bearing surface of the bush. In the same radial plane of this bore in the bush a radial bore 85 is also provided in the axis of the rotatable member, and opens into a longitudinal bore 86 extending up to the end of the axis at the cover side. In the float 81 a cross-pipe 87 is arranged parallel to the long axis of the rotatable member, and to this pipe the radial pipe 83 is connected. Contracted parts 88 are provided in the two mouths of the cross pipe 87 carried through the wall of the float, and inside the cross pipe a ball 89 is arranged which can move freely in this pipe. In the longitudinal bore 86 there is a throttle 90.

A second longitudinal bore 91 is provided in the axis 73 of the rotatable member, and is connected by a radial bore 92 to an annular groove 93 formed in the boss of the cover. The annular groove 93 is connected by bores to a pipe 70 admitting sealing oil. The sealing oil can reach annular grooves 95 that are turned in the periphery of the hub of the rotatable member through several bores starting from the longitudinal bore 91. By the sealing oil present in the annular grooves 93 and 95 and which stands under pressure, fuel is prevented from passing to the pipe union 14 and at the same time the running surface of the bush of the float is lubricated.

If the interior of the air separator shown in Fig. 4 is filled with fuel above a predetermined level, the float owing to its rise stands in the position shown and holds the annular bush in this position, in which its bore 84 does not coincide with the bore 85 in the rotatable member, so that the pipes 87 and 83 leading to the upper part of the interior of the casing are not connected to the longitudinal bore 86 in the rotatable member and thereby also not to the air discharge pipe. If so much air collects in the upper part of the internal space that it forces the fuel level more and more downwards, the float sinks with the fuel level and simultaneously rotates the annular bush also downwards. In this case, the openings 88 of the cross pipe 87 stand always higher than the level of the fuel, as the float only dips to a small depth in the fuel and does not reach these openings. If the level of the fuel sinks below a predetermined height and the float has turned to such an extent downwards that the bore 84 of the annular bush slides over the bore 85 of the rotary member, the air space in the interior of the casing is connected to the air discharge pipe and the air flows away to the induction pipe of the engine. By the admission of fresh fuel the float is again raised and the annular bush rotated to such an extent that the connection to the air discharge pipe is again interrupted, until so much separated air is again present in the internal space that the opening operation starts afresh. The pressure in the interior of the air separator also in this example of construction cannot sink below the desired pressure in the suction chamber of the injection pump on opening the air discharge pipe owing to the throttle 90 provided therein.

If the engine inclines sideways, for instance during flying in curves or the like, the axis of rotation of the rotatable member adjusts itself obliquely or even perpendicularly to the fuel level in the casing. In these cases, the opening 88 in the cross pipe 87 that is directed downward for the time being is closed by the ball 89, so that no fuel can pass through this opening to the pipe 83 and the annular sleeve. As these positions are only temporarily assured, the controlling of the rotatable member subject to the action of gravity and of the annular bush operated by the rise of the float is only interrupted for a short time. But even during this time an emergence of fuel through the air discharge is prevented by the cross pipe, so that in any desired working position of the engine only air free from fuel passes out of the air separator.

In the fuel-pumping plant shown in Fig. 5 two fuel reservoirs 3 are provided, one of which is out of operation at a time. Each delivery pump 4 is connected to the two reservoirs 3 by a branch-pipe 4a. By remote-controlled cocks H each reservoir can be connected by a branch of the suction pipe to a delivery pump. An air separator 6c, shown in Fig. 6, is connected by the union 18 to the common pressure pipe 5 of the two delivery pumps. This construction of the air separator differs in construction and operation from the examples already described by the feature that the casing of the air separator 11c is divided by a partition wall 96 into two chambers 97 and 98, the chamber 97 serving for the separation of the air carried with it by the fuel, while the chamber 98 is provided for the separation of particles of fuel which may still adhere to the air conveyed into this chamber. The fuel freed from air is conveyed from the first chamber 97 through the union 15 and the pipe 7 to the injection pump. The air freed from fuel in the chamber 98 passes from the centre of the air separator through the union 14 and the pipe 10a to the induction pipe S of the engine, while the fuel separated from the air in the chamber 98 is led away through a union 99 and the pipe 7a to the overflow pipe, which conveys it back to the suction pipe 4a of the delivery pump.

The rotatable member 100 arranged in the chamber 97 is mounted at one side in the partition wall 96 and at the other side in the cover 101 of this chamber. A radial bore 102 is arranged in the partition wall between the two chambers, and is connected at one end to the feed pipe 5, and at the other end opens into an annular space 103 provided on the rotatable member and open towards the partition wall 96, by which it is closed. As in the other examples of construction, the fuel is conveyed away from this annular space through radial pipes 104 that are fixed to the rotatable member, which under the action of the pendulum 105 always remains adjusted in approximately the same position relative to the outer space, so that the fuel freed from air can flow away from the part of the chamber 97 that is for the time being lowest through bores in the pendulum, in the way already described. If the delivery pumps deliver fuel containing air or bubbles, the gases collect in the upper part of the chamber and flow through the cross pipe 106 into the pipe 107 to the longitudinal bore 108 in the axis of the rotatable member and then pass to the chamber 98 through a bore 109 going through the partition wall 96.

In the chamber 98 a rotatable member 110 is also arranged, the journals of which are mounted at one side in an opening in the partition wall 96 and at the other side in a cover 111 which externally closes this space. A pendulum 112 fixed to the rotatable member 110 tends to adjust the rotatable member always into approximately the same position relative to the outer space. A sleeve 113 is inserted over the rotatable member, and can turn relative to the rotatable member, and contains two opposite radial bores staggered relative to each other in the longitudinal direction. To the bore situated at the top in the drawings a pipe 114 is connected, and this pipe is surrounded by a float 115, which is fastened to the sleeve.

In the same radial plane in which the said upper bore opens into the running surface of the sleeve a radial bore 116 is provided in the rotatable member 110 and opens into a longitudinal bore 117 in the axis of the rotatable member. The longitudinal bore 117 terminates at the end of the journal of the rotatable member that is mounted in the partition wall 96 in a space that is connected by a passage 118 in the partition wall to the air discharge pipe 10a. In the passage 118 there is a throttle 120.

In the bore of the sleeve that is situated at the bottom in the drawings a pipe 121 is fixed, whose free end thus projects into the internal space of the chamber 98 in an opposite direction to the pipe 114. In the radial plane of this pipe a radial bore 122 is arranged in the axis of the rotatable member, and merges into a longitudinal bore 123 opening out at the cover side. A union 99 is screwed into the boss of this cover, and connects the pipe 7a and thus the overflow pipe 5a of the delivery pump to the air separator. In the longitudinal bore 123 there is also a throttle 124, which throttles the passage of the fuel passing through the pipe 121 and the longitudinal bore 123. Several grooves 125 turned in the axis of the rotary member are connected by a longitudinal groove in the rotatable member to a sealing oil pipe 126 connected to the boss of the cover.

Air or fuel passes from the chamber 97 through the cross pipe 106, pipe 107 and the bore 108 and 109 into the chamber 98. Air bubbles separate therein from the fuel. When the level of the fuel is low, the float is rocked downward, as shown in Fig. 7, while the opening of the air-discharge pipe 114 surrounded by the float always stands higher than the level of the fuel. When a certain level is reached the air discharge pipe 114 is connected to the bore 116 and the longitudinal bore 117 of the rotatable member, so that the air can escape through the bore 118, 119 and 120 to the union 14, and from this through the pipe 10a to the induction pipe of the engine. The pipe 121 does not dip into the fuel in this position of the float, and the sleeve closes the bore 122 for the discharge of fuel to the pipe 7a.

As soon as the fuel has risen above a predetermined level (Fig. 8), the sleeve rotated by the float closes the bore 116, also on a further rise of the level, the air discharge pipe 7a remains constantly shut off from the chamber. For this, the pipe 121 dips on the further rotation of the bush into the fuel level, and when it comes into register with the bore 122, fuel flows away through the longitudinal bore 123, throttle 124, and the union, through the pipe 7a to the suction side of the delivery pump. In this example of construction, the passage of fuel-free air and air-free fuel to the discharge pipes is so throttled by the throttles 120 and 124 respectively, that the opening of these discharge pipes cannot lead to a sinking of the pressure in the first chamber of the air separator, and thus in the suction chamber of the injection pump, below the desired pressure.

We declare that what we claim is:

1. An air separator for fuel-pumping apparatus for aircraft or other internal combustion engines that are variable in position comprising a casing provided with an inlet for fuel under pressure, an outlet for fuel under pressure and an outlet for air, means rotatably mounted in said casing and provided with radially-extending passages having inlets adjacent a peripheral wall and opening into the interior of said casing, one of said passages being connected to said fuel outlet and the other being connected to said air outlet, means carried by said rotatable means for maintaining the same in such a position that the inlet end of the fuel passage of said rotatable means is always in the lower portion of said casing and the inlet end of the air passage of said rotatable means is always in the upper portion of said casing in any position of said casing about its axis, and float-controlled means carried by said rotatable means for automatically closing said air passage as soon as a predetermined fuel level has been reached in said casing.

2. An air separator for fuel-pumping apparatus for aircraft or other internal combustion engines that are variable in position comprising a casing provided with an inlet for fuel under pressure, an outlet for fuel under pressure and a restricted outlet for air, means rotatably mounted in said casing and provided with radially-extending passages terminating adjacent a peripheral wall and opening into the interior of said casing, one of said passages being connected to said fuel inlet, another passage being connected to said fuel outlet and another passage being connected to said air outlet, means carried by said rotatable means for maintaining the same in such a position that the inlet end of the fuel outlet passage of said rotatable means is in the lower portion of said casing and the inlet end of the air outlet passage and the discharge end of the fuel inlet passage of said rotatable means are in the upper portion of said casing in any position of said casing about its axis, a float carried by said rotatable means and movable relative thereto, and valve means controlled by the movement of said float member relative to said rotatable means and automatically closing the inlet end of said air outlet passage when a predetermined fuel level has been reached in said casing.

3. An air separator as set out in claim 1 in which the casing is cylindrical and the rotatable means is provided with journals each located in the same axis and mounted in a bearing arranged in the center of an end wall of the casing.

4. An air separator as set out in claim 1 in which the casing is provided with axial hollow bearings forming the outlet for fuel and the outlet for air respectively of said casing, the rotatable means being provided with journals by which said rotatable means is mounted for rotation in said hollow bearings, said journals being provided with longitudinally extending passages which register, respectively, with the radially extending passages in said rotatable means, and the outlet for fuel and the outlet for air provided by said hollow bearings.

5. An air separator as set out in claim 1 in which the float controlled means includes a float member radially guided on said rotatable means, and a valve in said air passage and controlled by said float member, said valve being closed and opened by radial movement of said float member relative to said rotatable means.

WILLY VOIT.
JOHANN FRIEDRICH JANSSEN.